3,157,708
PROCESS FOR MAKING CYCLODODECATRIENE

William J. Munley, Jr., North Plainfield, and Herbert K. Wiese, Cranford, N.J., assignors to Esso Research and Engineering Company, a corporation of Delaware
No Drawing. Filed Apr. 1, 1960, Ser. No. 19,184
12 Claims. (Cl. 260—666)

The present invention relates to an improved catalyst and process for the preparation of 1,5,9-cyclododecatriene (CDT) by the alkyl metal catalyst trimerization of butadiene. More particularly, this invention relates to obtaining a large improvement in selectivity to trimer by utilizing an improved $TiCl_4 + AlEt_3$ or $TiCl_4 + AlEt_2Cl$ catalyst wherein the ratio of ethyl groups to aluminum in the catalyst is controlled at 1 to 1.3:1. Yet more particularly, this invention relates to preparing such improved catalysts by dissolving the $TiCl_4$ and either $AlEt_3$ or $AlEt_2Cl$ in a hydrocarbon solvent, allowing them to react for a suitable period, and then adding $AlCl_3$ and/or HCl, preferably $AlCl_3$, in amounts such that on further reaction the Et/Al ratio becomes about 1. Most particularly, this invention relates to utilizing specifically an $AlEt_3 + TiCl_4$ prepared catalyst and also controlling the ratio of Al/Ti in the initial mixing of the catalyst in the hydrocarbon solvent in the range of 1.0 to 2.0:1, preferably 1.25:1.

The trimerization of butadiene at 45 to 60° C. in the presence of a catalyst consisting of $TiCl_4 + AlEt_3$ or $TiCl_4 + AlEt_2Cl$ is known at this time. Thus in this process the following cyclic compounds are obtained. These are the cis, trans, trans (cis, tr., tr.) and the trans, trans, trans (tr., tr., tr.) isomers as shown in the formulas below.

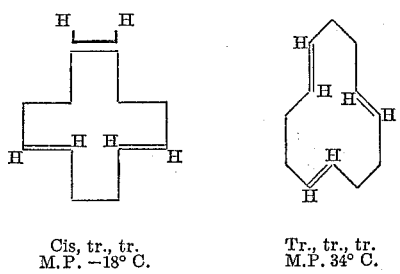

Cis, tr., tr.
M.P. −18° C.

Tr., tr., tr.
M.P. 34° C.

Although four stereo-isomers of 1,5,9-cyclododecatriene are theoretically possible, only the above two are ordinarily obtained in the reaction. It should be noted that either of the isomers above represented, or of the other isomers, may be prepared utilizing the process and catalyst of the present invention.

According to the prior art process, the catalyst utilized is prepared by reducing $TiCl_4$ with $AlEt_3$ or $AlEt_2Cl$, preferably in ratios as shown in the following two equations:

(1) $TiCl_4 + AlEt_3 \rightarrow TiCl_3 + AlEt_2Cl$ (2) $TiCl_4 + 4AlEt_2Cl \rightarrow TiCl_3 + AlEtCl_2 + 3AlEt_2Cl$ Utilizing either of these catalysts, about 75 to 80% cyclododecatriene selectivities are obtained, the remainder of the product being polybutadiene. It should be noted that the presence of this polybutadiene creates a considerable processing problem in that a large part of this polybutadiene has a molecular weight over 10,000. Thus, the following difficulties are encountered:

(1) The presence of high molecular weight polybutadiene makes the reaction mixture very viscous and therefore difficult to stir.

(2) The polybutadiene causes excessive fouling in the reactor and heat exchangers.

(3) Since cyclododecatriene is ordinarily recovered from the reaction mixture by steam distillation, the presence of considerable amounts of high molecular weight polybutadiene makes the cyclododecatriene recovery more expensive due to the greater steam requirements necessary to strip all the cyclododecatriene from the polymer.

An improved process has now been discovered which not only greatly alleviates the above described processing difficulties (due to producing lower molecular weight polymer as by-product) but also at the same time gives much higher selectivities to cyclododecatriene (above 90% as compared to 75–80%). This improvement is obtained by controlling the Et/Al ratio in the catalyst in the range of 0.9 to 1.3:1, preferably 0.9 to 1.1:1, e.g. 1:1 as compared to the prior art catalyst ratio of about 2:1.

The prior art catalysts for producing cyclododecatriene are prepared in accordance with the reactions shown above. Although it is not intended to limit the present invention to any particular theory for the improvement obtained, the present invention may be more clearly understood by considering that the present invention catalyst differs from the prior art catalyst in structural formula as follows (prior art catalyst considered to be mainly a mixture of types A and B while the present invention catalyst controlled to be as nearly as possible only type B):

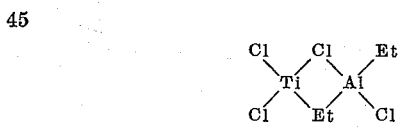

Type A

Et/Al Ratio=2, forms polymer

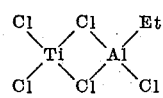

Type B

Et/Al ratio=1, forms CDT

Although based on the equations and structural formulae shown above, one would expect to be able to obtain the desired catalyst compound (type B) by merely using the correct stoichiometric amounts of TiCl$_4$ and AlEt$_3$ or AlEt$_2$Cl, the present catalyst may not be so obtained. Thus, for example, if one uses a 1:1 ratio of TiCl$_4$ and AlEt$_2$Cl, the complete reduction of TiCl$_4$ to TiCl$_3$ is not secured. Likewise, it is also very difficult to obtain complete reduction of TiCl$_4$ when using AlEt$_3$ and TiCl$_4$ in a ratio of 0.33/1. Since the presence of any TiCl$_4$ in the reactor results in the formation of large amounts of polybutadiene, obviously other methods must be used.

The catalyst of the present invention may be prepared for example by any of the following methods. In general the catalysts are prepared in the presence of an insert C$_5$–C$_{12}$ hydrocarbon diluent such as heptane, hexane, cyclohexane, benzene, toluene, xylene, etc. Although aliphatic or alicyclic hydrocarbons are suitable diluents, aromatic hydrocarbons, particularly benzene and xylene, are preferred. The amount of the hydrocarbons used based on total catalyst plus hydrocarbon can vary over a wide range from 10 to 99 wt. percent but the preferred range is 85 to 99 wt. percent hydrocarbon.

A preferred method for preparing this catalyst is to dissolve 1.0 to 1.5, preferably 1.25, moles of AlEt$_3$ per mole of TiCl$_4$ in C$_5$–C$_{12}$ aliphatic, aromatic or alicyclic hydrocarbon solvent as above described, and allowing these materials to react to reduce the TiCl$_4$ to TiCl$_3$. Thus, temperatures from −20 to 100° C., preferably 25 to 60° C., and contact times ranging from one minute to 360 minutes, preferably 5 to 30 minutes may be used. Following this reaction sufficient anhydrous AlCl$_3$ and/or HCl, preferably AlCl$_3$, is added to bring the ethyl to aluminum ratio of the catalyst to 0.9 to 1.3:1, preferably 0.9 to 1.1:1. This usually requires from 0.6 to 1 mole of AlCl$_3$ or HCl for every mole of AlEt$_3$ used. The entire catalyst mixture is then allowed to react an additional 1 to 240 minutes at 25 to 100° C., preferably 25 to 80° C., to obtain a removal of ethyl groups by either an exchange reaction (with AlCl$_3$) or a displacement reaction (with HCl). It should be noted that also rather than AlCl$_3$ it is contemplated that anhydrous HgCl$_2$, BCl$_3$, AsCl$_3$, and SbCl$_3$ may also be used under the same conditions and using similar amounts of these materials (as used with AlCl$_3$).

Alternatively, a similar technique may be used to prepare the present catalyst from TiCl$_4$+AlEt$_2$Cl. However, of course, such a preparation is less preferred since large amounts of the aluminum compound must be used, i.e. 3.0 to 5.0:1 ratios of Al/Ti. These materials are dissolved in the hydrocarbon solvent and are allowed to react to reduce the TiCl$_4$ to TiCl$_3$. Following reduction if excess AlEt$_2$Cl has been used additional adjustment of the Et/Al ratio may be obtained (if desired) by reacting with AlCl$_3$ (or the other metal chlorides described above) or HCl, preferably AlCl$_3$, all under the conditions as described above.

Another method for preparing the catalyst consists of reacting preformed TiCl$_3$·0.33AlCl$_3$, prepared by reducing TiCl$_4$ with aluminum metal, with aluminum ethyl sesquichloride according to the following equation:

This reaction is preferably carried out by dispersing ball milled TiCl$_3$·0.33AlCl$_3$ in some hydrocarbon solvent such as those described above, followed by adding the AlEt$_2$Cl and AlEtCl$_2$. The mixture is allowed to react at temperatures ranging from 25 to 100° C., preferably 25 to 80° C., and contact times ranging from 1 minute to 480 minutes, preferably 10 to 240 minutes, to obtain the desired exchange reaction and thus a 1:1 ratio of Et/Al. Similarly other proportions of the materials described in the above equation (including the proportions of TiCl$_3$ and AlCl$_3$) may be used to obtain Et/Al ratios within the preferred ranges of this invention.

A third method of preparing the catalyst consists of adding AlEtCl$_2$ to preformed TiCl$_3$ dispersed in the hydrocarbon solvents above described. Although this catalyst gives high selectivities to cyclododecatriene, the butadiene reaction rate is low compared to the reaction rates obtained with the other catalysts. The reaction rate obtained with the catalyst prepared from TiCl$_3$+AlEtCl$_2$ can be improved by either ball milling the two components together for long periods of time or by using chlorobenzene as a solvent in place of the solvents mentioned above. Both techniques, however, make this catalyst more expensive than the catalysts prepared from either TiCl$_4$+AlEt$_3$+AlCl$_3$ or TiCl$_4$+AlEt$_3$+HCl.

The catalyst of the present invention may also be prepared by adding to TiCl$_3$ dispersed in some hydrocarbon, such as above described, aluminum metal plus an alkyl halide, preferably a C$_1$ to C$_3$ or neopentyl type halide at temperatures of 25 to 100° C. Preferably the halide would be the chloride although of course the iodide and bromide may be used.

It should be noted that in the catalysts of the present invention in general ratios of Al/Ti are in the range of 0.5 to 5.0:1. According to the present invention compounds such as butadiene, isoprene and piperylene, preferably butadiene, may be trimerized to obtain 1,5,9-cyclododecatrienes by reacting these materials with the above described catalyst at temperatures in the range of 30 to 100° C., preferably 40 to 80° C., and pressures of 0.5 to 10, preferably 1 to 2 atmospheres. Contact times for the butadiene stream may be in the range of 30 to 600 minutes, preferably about 1 to 6 hours, while weight ratios of butadiene to diluent free catalyst supplied to the reactor may be in the range of 10 to 500, preferably 100 to 200. It is also contemplated that the present invention catalyst may be advantageously used in processes wherein dilute butadiene, isoprene and piperylene streams may be trimerized in accordance with the technique described in U.S. application Ser. No. 862,184, filed December 28, 1959. Thus, in these dilute diolefin feed stream processes both a selective trimerization of the diolefin to form the desired product and a purification of the remaining components (i.e. similarly to conventional extraction) are obtained.

Following reaction the product stream containing cyclododecatriene, reaction byproducts and catalyst slurry is mixed with isopropyl or any low molecular weight alcohol or water to completely deactivate the catalyst components. The deactivated stream is then contacted with dilute caustic or acid. When using acid the catalyst components are converted into water extractable materials. These materials are then separated into an aqueous layer and a hydrocarbon layer which is passed to a suitable recovery system for separation of cyclododecatrienes, reaction byproducts and unreacted diolefins. When using steam distillation as a means of recovering cyclododecatriene from the reaction mixture, the steam can be used to deactivate the catalyst.

The present invention will be more clearly understood from a consideration of the following examples wherein the catalyst is dissolved or dispersed in the solvent in a reactor and pure butadiene is introduced into the catalyst solvent mixture. In each case the temperature rose from room temperature to a temperature of about 40–60° C. which temperature was maintained by cooling. Following reaction the catalyst was decomposed by adding 50 ml. of isopropyl alcohol to the reaction mixture followed by the addition of 100 ml. of 20 wt. percent aqueous hydrochloric acid. The mixture was then allowed to separate into two layers and the hydrocarbon mixture was passed to distillation and separated into fractions as described.

EXAMPLE 1

*Preparation of Cyclododecatriene at 60° C.*

| Run No. | 1 | 2 | 3 m | 4 | 5 | 6 | 7 j | 8 |
|---|---|---|---|---|---|---|---|---|
| Catalyst Charged, g.a: | | | | | | | | |
| TiCl$_4$ | 2.6 | 1.85 | 1.30 | | | | | 2.6 |
| TiCl$_3$.33AlCl$_3$ | | | | f 3.17 | g 2.51 | i 3.74 | | |
| TiCl$_3$ | | | | | | | l 2.92 | |
| AlEt$_2$Cl | 6.7 | | | 0.67 | 0.50 | | | 6.7 |
| AlEtCl$_2$ | | | | 0.74 | 0.53 | 2.4 | 2.4 | k 6.5 |
| AlEt$_3$ | | 1.12 | 0.974 | | | | | |
| AlCl$_3$ | | 1.02 | 1.02 | | | | | |
| Ratio of Al/Ti | 4.1 | 1.8 | 2.375 | 1 | 1 | 1.2 | 1 | 4.7 |
| Ratio of Et/Al b | 1.8 | 1.1 | 1.26 | 1 | 1 | h 0.8 | 1 | 1.15 |
| Duration of Run, Hrs | 1.5 | 1.5 | 2.5 | 1.5 | 3.2 | 2.2 | 3 | 1.5 |
| Butadiene Reaction Rate, g. C$_4$H$_6$/g. TiCl$_3$/hr | 70 | 92 | 218 | 57 | 26 | 51 | 23 | 75 |
| Selectivity, Percent: | | | | | | | | |
| C$_8$ c | 2.2 | trace | trace | trace | trace | trace | trace | 4.4 |
| Cyclododecatriene | 76.0 | 88 | 92.0 | 90.7 | 91.8 | 30.8 | 80.5 | 74.0 |
| Polymer | d 21.8 | e 12 | e 8.0 | e 9.3 | e 8.2 | 69.2 | 19.5 | 21.5 | a Used 375 ml. benzene in all runs except Runs 3 and 7.
b Calculated Et/Al ratio by assuming one Et group lost when TiCl$_4$+AlEt$_2$Cl or TiCl$_4$+AlEt$_3$ react and none when TiCl$_3$.33AlCl$_3$+.33 AlEt$_2$Cl+.33AlEtCl$_2$ reacts.
c Mixture of cyclooctadiene and vinyl cyclohexene.
d Acetone insoluble polymer had an average molecular weight of greater than 10,000.
e Acetone insoluble polymer had an average molecular weight of less than 3,000.
f Beta form of TiCl$_3$.33AlCl$_3$ (brown) prepared from TiCl$_4$+Al. Ball milled 6 days.
g Gamma form of TiCl$_3$.33AlCl$_3$ (violet) prepared from TiCl$_4$+Al. Ball milled 16 days.
h Contains small amount of AlCl$_3$.
i Beta form of TiCl$_3$.33AlCl$_3$ (brown) prepared from TiCl$_4$+Al. Ball milled 6 days.
j Used 375 ml. of chlorobenzene.
k Prepared catalyst by reacting TiCl$_4$ with AlEt$_2$Cl in benzene first, then removed 80% of the benzene phase and added fresh benzene containing AlEtCl$_2$.
l Alpha form of TiCl$_3$ (violet) prepared from TiCl$_4$+H$_2$. Ball milled 6 days.
m Used 450 ml. of xylene. Three additional runs made to check results.

The above data show that the Et/Al ratio must be about 1:1 in order to obtain better than 80% selectivity to cyclododecatriene. Using an Et/Al ratio of less than 1 produces very deleterious results because of the presence of AlCl$_3$. Where TiCl$_4$ is used it is desired to maintain Et/Al ratios sufficiently high to reduce the TiCl$_4$ to TiCl$_3$ yet still as close to 1:1 as possible. Thus, the need for Et/Al ratio of 1 appears to indicate that the catalyst components for making cyclododecatriene are TiCl$_3$ and AlEtCl$_2$. This is substantiated by Run 7 where the only added catalyst components were TiCl$_3$ and AlEtCl$_2$. The selectivity to cyclododecatriene in this run was 80.5%. The data also show that the average molecular weight of the polymer produced by using an Et/Al ratio of 1 is very low compared to the molecular weight of the polymer produced in the conventional process. In the conventional process dropping the temperature from 60° C. to 45° C. results in about a 3% increase in selectivity to cyclododecatriene. The effect of temperature between 45° C. and 60° C. is very small in the present process where the Et/Al ratio is 1.

As the data above indicate, the preferred Al/Ti ratio is in the range of 1 to 2:1. However where AlEt$_2$Cl is used ratios in the range of 2 to 5:1 are necessary to obtain complete reduction of the TiCl$_4$. From the only slight decrease in cyclododecatriene selectivity suffered in raising the Al/Ti ratio to about 4:1 it would appear that this ratio is somewhat less critical than the Et/Al ratio.

*Example 2*

Diluent: Benzene.
Reaction temperature: 45° C.
Feed: 1,3 butadiene (99.5+%).
Monomer concentration in reactor: Reaction mix was saturated with butadiene at all times—conc. about 9.0 wt. percent butadiene.
Catalyst: Al(C$_2$H$_5$)$_3$-TiCl$_4$ mixed in benzene at room temperature for 15-30 minutes.

| Al/Ti 1 Molar Ratio | Selectivity to CDT, Wt. Percent | Butadiene Conversion Rate, g./hr./g. of Ti | | | | | | | | | | |
|---|---|---|---|---|---|---|---|---|---|---|---|---|
| | | Residence Time, Min. | | | | | | | | | | |
| | | 10 | 20 | 30 | 40 | 60 | 80 | 90 | 100 | 120 | 150 | 160 |
| 0.834 | | | | | | 172 | | | 251 | | 216 | |
| 0.834 | 66.3 | | | | 146 | | 222 | | | 247 | | 222 |
| 1.25 | 80.2 | 329 | 432 | | 500 | 421 | | 337 | | 218 | | |
| 1.66 | 73.1 | 468 | | 278 | | 128 | | 64 | | | | |
| 0.54 | (2) | | | | | 74 | | | | | | |

1 Adjusted ratio expressed as pure AlEt$_3$—actual purity—conc. about 83.4 wt. percent AlEt$_3$, 16.6 wt. percent inert.
2 Polybutadiene was the principal product—the selectivity to CDT was very low.

It can be seen from this data that the rate of consumption of butadiene in the synthesis of cyclododecatriene increases with time from a very low initial value to a maximum, and then decreases at greater times. The period during which the rate is increasing to a maximum ("induction" period) represents a loss in potential conversion capacity of the catalyst-catalyst efficiency. From the standpoint of obtaining high catalyst efficiencies in the smallest possible residence times, the most desirable rate curves (rate vs. time) can be obtained with an Al/Ti ratio (measured without inclusion of any AlCl$_3$ added to reduce the Et/Al ratio) of about 1 to 1.5:1. Thus, lower (probably due to the presence of unreduced TiCl$_4$) ratios result in long induction periods, while higher ratios result in an excessively fast decline in reaction rates. It should be noted that for maximizing reaction rates in an

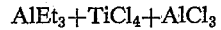

system Al/Ti ratios should be measured without allowing for the AlCl₃ added after reduction of the TiCl₄ to TiCl₃.

It is to be understood that this invention is not limited to the specific examples, which have been offered merely as an illustration, and that modifications may be made without departing from the spirit of this invention.

What is claimed is:

1. An improved catalyst for the trimerization of butadiene to cyclododecatriene prepared by dissolving a material selected from the group consisting of AlEt₃ and AlEt₂Cl along with TiCl₄ in a hydrocarbon solvent, allowing these materials to react to reduce the TiCl₄ to TiCl₃ and adding AlCl₃ to the reaction mixture in an amount sufficient to bring the molar ratio of ethyl to aluminum to 0.9 to 1.3:1.

2. An improved catalyst for the trimerization of butadiene to cyclododecatriene prepared by dissolving a material selected from the group consisting of AlEt₃ and AlEt₂Cl along with TiCl₄ in a hydrocarbon solvent, the relative amounts of the compounds being such that the aluminum to titanium molar ratio is in the range of 1.0 to 5:1, allowing these materials to react to reduce the TiCl₄ to TiCl₃ and adding AlCl₃ to the reaction mixture in an amount sufficient to bring the ethyl to aluminum molar ratio of the catalyst to 0.9 to 1.3:1.

3. An improved catalyst for the trimerization of butadiene to cyclododecatriene prepared by dissolving aluminum triethyl along with TiCl₄ in a hydrocarbon solvent, allowing these materials to react to reduce the TiCl₄ to TiCl₃ and adding AlCl₃ to the reaction mixture in an amount sufficient to bring the ethyl to aluminum molar ratio of the catalyst to 0.9 to 1.3:1.

4. An improved catalyst for the trimerization of butadiene to cyclododecatriene prepared by dissolving aluminum triethyl along with TiCl₄ in a hydrocarbon solvent, the relative amounts of the compounds being such that the aluminum to titanium molar ratio is in the range of 1.0 to 2:1, allowing these materials to react to reduce the TiCl₄ to TiCl₃ and adding AlCl₃ to the reaction mixture in an amount sufficient to bring the ethyl to aluminum molar ratio of the catalyst to 0.9 to 1.3:1.

5. An improved process for the trimerization of diolefins to cyclododecatrienes which comprises reacting diolefin material selected from the group consisting of butadiene, isoprene and piperylene with a catalyst prepared by dissolving a material selected from the group consisting of AlEt₃ and AlEt₂Cl along with TiCl₄ in a hydrocarbon solvent, allowing these materials to react to reduce the TiCl₄ to TiCl₃ and adding AlCl₃ to the reaction mixture in an amount sufficient to bring the molar ratio of ethyl to aluminum to 0.9 to 1.3:1 and recovering cyclododecatrienes from the reaction products.

6. The process of claim 5 wherein the starting diolefins are used in admixture with above 50% of other hydrocarbon gases.

7. The process of claim 5 in which the hydrocarbon solvent is an aromatic hydrocarbon.

8. An improved process for the trimerization of butadiene to 1,5,9-cyclododecatriene which comprises reacting butadiene with a catalyst prepared by dissolving AlEt₃ and TiCl₄ in a hydrocarbon solvent, allowing these materials to react to reduce the TiCl₄ to TiCl₃ and adding AlCl₃ to the reaction mixture in an amount sufficient to bring the ethyl to aluminum molar ratio of the catalyst to 0.9 to 1.3:1, and recovering cyclododecatriene from the reaction products.

9. The process of claim 8 in which additionally the amount of the aluminum compounds and titanium compounds is controlled to obtain an aluminum to titanium molar ratio in the range of 1.0 to 2:1.

10. The process of claim 8 in which the hydrocarbon solvent is an aromatic hydrocarbon.

11. An improved process for the trimerization of butadiene to 1,5,9-cyclododecatriene which comprises reacting butadiene with a catalyst prepared by dissolving AlEt₂Cl along with TiCl₄ in a hydrocarbon solvent, the relative amounts of the compound being such that the Al/Ti molar ratio is in the range of 3.0 to 5:1, allowing these materials to react to reduce the TiCl₄ to TiCl₃, adding AlCl₃ to the reaction mixture in an amount sufficient to bring the ethyl to aluminum ratio of the catalyst to 0.9 to 1.3:1, and recovering cyclododecatriene from the reaction products.

12. An improved process for the trimerization of butadiene to 1,5,9-cyclododecatriene which comprises reacting butadiene with a catalyst prepared by TiCl₄ with aluminum triethyl in a hydrocarbon solvent the relative amounts of the respective compounds being controlled so as to obtain an aluminum to titanium ratio in the range of 1.0 to 2:1, allowing these materials to react to reduce the TiCl₄ to TiCl₃, adding AlCl₃ to the reaction mixture an amount sufficient to bring the ethyl to aluminum ratio to 0.9 to 1.3:1, and recovering cyclododecatriene from the reaction products.

References Cited in the file of this patent

UNITED STATES PATENTS

| | | |
|---|---|---|
| 2,964,574 | Wilke | Dec. 13, 1960 |
| 2,979,544 | Wilke | Apr. 11, 1961 |

FOREIGN PATENTS

| | | |
|---|---|---|
| 555,180 | Belgium | Aug. 20, 1957 |